Dec. 29, 1925.

Q. A. BRACKETT 1,567,565

RECEIVING SYSTEM

Filed March 30, 1921     2 Sheets-Sheet 1

WITNESSES:
K.C.Clowes
H.L.Godfrey

INVENTOR
Quincy A. Brackett
BY
Wesley G. Carr
ATTORNEY

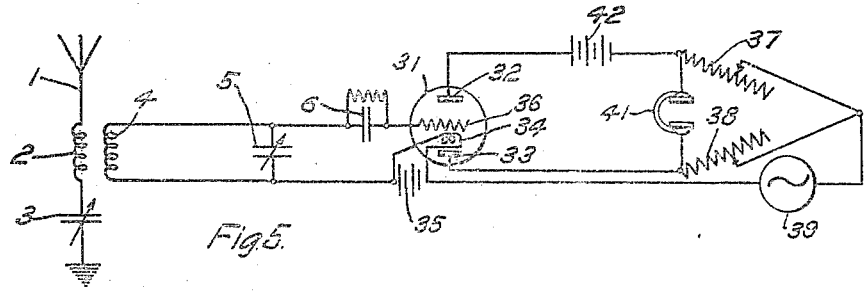
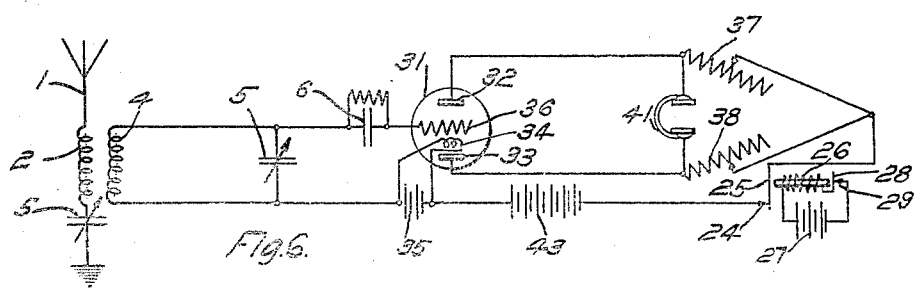

Patented Dec. 29, 1925.

1,567,565

UNITED STATES PATENT OFFICE.

QUINCY A. BRACKETT, OF PITTSBURGH, PENNSYLVANIA, ASSIGNOR TO WESTINGHOUSE ELECTRIC & MANUFACTURING COMPANY, A CORPORATION OF PENNSYLVANIA.

RECEIVING SYSTEM.

Application filed March 30, 1921. Serial No. 456,854.

*To all whom it may concern:*

Be it known that I, QUINCY A. BRACKETT, a citizen of the United States, and a resident of Pittsburgh, in the county of Allegheny and State of Pennsylvania, have invented a new and useful Improvement in Receiving Systems, of which the following is a specification.

My invention relates to a system for the amplification of received signals, and more particularly it relates to a system employing a thermionic amplifier included as an element in a balanced circuit, the resistance of the amplifier being changed by the received signal to unbalance the circuit, whereby amplified effects are produced.

My invention consists in the employment of a balanced Wheatstone bridge arrangement in which one of the arms includes a thermionic amplifier. A source of current is connected across one diagonal of the bridge and the incoming signal changes the resistance of the plate circuit of the thermionic amplifier to unbalance the Wheatstone bridge. A detector is connected across the opposite diagonal, and the unbalanced condition of the bridge that obtains when the resistance of the plate circuit of the thermionic amplifier is effected by incoming signals, produces in the detector a greatly amplified signal.

There are several arrangements which I have adopted for utilizing the change in resistance of a vacuum tube, by reason of received signal current, to unbalance the circuits in a Wheatstone bridge. I may employ systems in which the plate circuit of a vacuum tube is comprised in one arm only of the bridge, or I may utilize a specially constructed vacuum tube having two plates and one filament, the two plates being comprised in different arms of the bridge.

Figure 3:
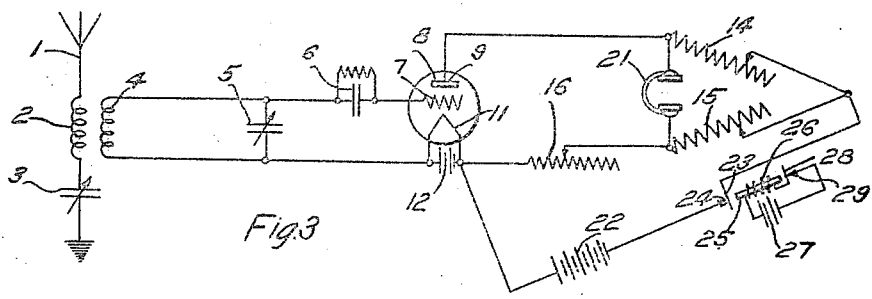

Fig. 3 diagrammatically illustrates a scheme employing interrupted direct current connected across a diagonal of the Wheatstone bridge.

Figure 4:
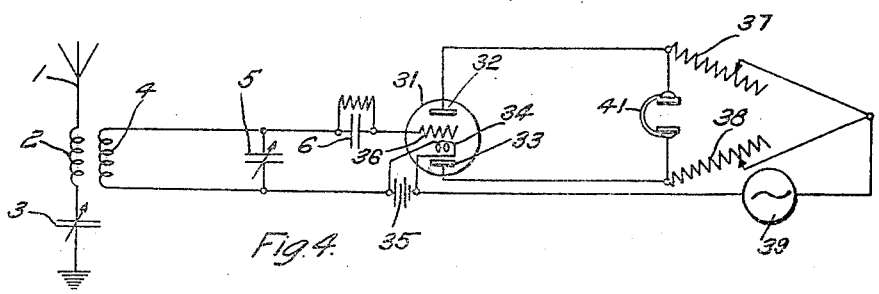

Fig. 4 is a schematic illustration of a system employing a vacuum tube having two plates and one grid, the two plates being comprised in different arms of the Wheatstone bridge.

Fig. 5 illustrates diagrammatically a modification of the scheme shown in Fig. 4 in which there is a plate battery located in the arms of the bridge comprising one of the plate elements.

Fig. 6 is a schematic illustration of a modification of the system shown in Fig. 4 in which interrupted direct current is connected across a diagonal of the bridge.

Figure 1:
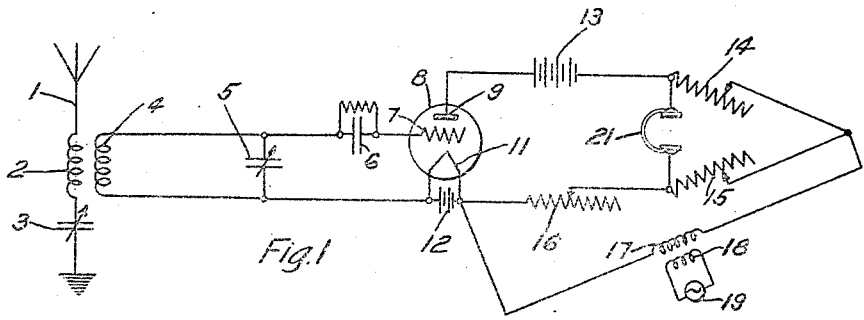
Figure 1 is a diagrammatic view illustrating a system employing a vacuum tube in one arm of a Wheatstone bridge, in which there is a plate battery located in the plate circuit of the tube.

In Fig. 1 I have shown an antenna circuit comprising an antenna 1, an induction coil 2, and a variable condenser 3 from which the circuit is connected to ground. Inductively coupled to the induction coil 2 is an induction coil 4 shunted by a variable condenser 5, whereby the circuit comprising the induction coil 4 and the variable condenser 5 may be tuned to the desired frequency. The induction coil 4 is connected preferably through a grid condenser and grid leak 6, to a grid 7 of a vacuum tube 8. The vacuum tube 8 comprises the grid element 7, a plate element 9 and a filament element 11. At its opposite end the induction coil 4 is connected to the filament element 11.

The filament element 11 is heated by means of a suitable "A" or filament battery 12 that maintains the filament at a proper degree of heat for efficient electron emission. The plate circuit of the vacuum tube 8 is connected in one arm of a Wheatstone bridge. In the same arm is also connected a plate battery 13. The remaining arms of the Wheatstone bridge comprise variable impedances 14, 15 and 16. The impedance 16 is connected to the filament 11, completing the circuit through the four arms of the bridge.

Connected across one diagonal of the Wheatstone bridge, as between the filament 11 and the junction between the impedances 14 and 15, is a source of relatively low-voltage, audible frequency current 19, which may be coupled to the bridge by means of an audio-frequency transformer 18, 17. Across the other diagonal of the bridge are connected telephone receivers 21.

In operation, the antenna circuit is tuned to receive signals of the frequency transmitted, by adjusting the variable condenser 3. By reason of the inductive coupling of the induction coil 2 to the induction coil 4, radio frequency oscillations are set up in the circuit comprising induction coil 4. The last-mentioned circuit has been tuned to the desired frequency by varying the condenser 5 to make the circuit resonant to the received frequency. Through the connection of the induction coil 4 to the grid 7 of the electron tube 8, the potential of the grid 7 is changed in accordance with the received signals. The grid condenser and grid leak 6 perform the customary function of maintaining the grid at a proper negative value.

The impedance of the plate circuit of the tube 8 is largely changed by reason of the change in potential of the grid 7, and since the Wheatstone bridge has been adjusted to be balanced under normal conditions, the change in the impedance of the plate circuit will throw the Wheatstone bridge out of balance. A different in potential will then exist across the diagonal in which are connected the telephone receivers 21. Alternating current of audible frequency is supplied across the other diagonal of the bridge, producing audible fluctuations in the telephone diaphragms.

It is obvious that the scheme just described avoids the use of heterodyning apparatus and provides means for readily detecting undamped telegraphic signals.

Figure 2:
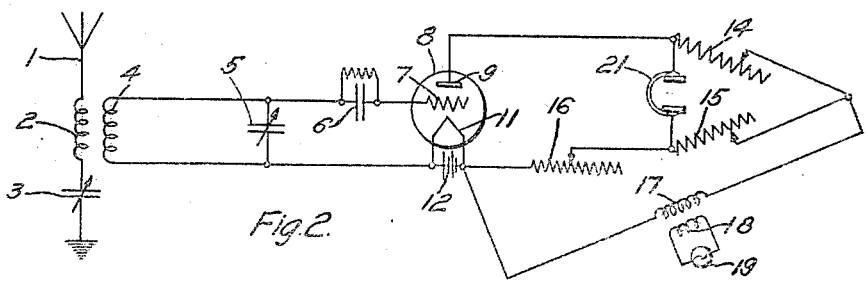
Fig. 2 is a diagrammatic illustration of a modification of the scheme shown in Fig. 1, in which there is no plate battery in the plate circuit of the tube.

Referring to Fig. 2 I have shown a scheme similar to that shown in Fig. 1 with the exception that the plate battery 13 is omitted and the voltage of the alternating current source has been raised to an equivalent voltage necessary to compensate for the removal of the plate battery. It has been found in practice that an alternating current source of from twenty to forty volts will be sufficient. By reason of the increased voltage supplied, the bridge shown in Fig. 2 must be more perfectly balanced than that shown in Fig. 1.

The operation of the arrangement shown in Fig. 2 is similar to the operation of that shown in Fig. 1, the difference being that the alternating current input across the diagonal of the bridge, performs the functions of both a plate battery and an alternating current source, whereby the unbalanced condition of the bridge may be detected in the telephone receivers 21.

In the scheme shown in Fig. 3, I employ a system similar to that schematically shown in Fig. 2, with the exception that I have employed, instead of an alternating-current input across the diagonal of the Wheatstone bridge, an interrupted direct-current input. The direct-current input is shown as comprising a battery 22 and a circuit interrupting mechanism comprising an armature 23 of spring metal, contacting with a contact member 24, both in series with the source of direct current 22. The armature 23 is adapted to be attracted by a magnet core 25, energized by a magnetizing coil 26 in a circuit comprising a battery 27, an armature 28 and a contact member 29. The armature 28 is periodically attracted by the core 25 and the circuit through the magnetizing coil 26 is broken, whereby the core 25 is demagnetized. Since the magnet core 25 is magnetized and demagnetized periodically the core 25 periodically attracts the armature 23 against the natural spring of the metal to interrupt the circuit of the battery 22. The current flowing through the Wheatstone bridge consists of rapid successive pulses of direct current instead of sinusoidal alternating current, as in the schemes illustrated in Figs. 1 and 2.

The operation is the same as that of the alternating current scheme shown in Fig. 2, but there is an advantage to be gained by the use of the interrupted direct current. In the schemes employing alternating current it has, under certain conditions, been found a difficult matter to balance out the alternating-current hum, because the generators have high capacity to ground. This disadavantage is overcome by employing an interrupter, such as I have shown, which does not have high capacity to ground and makes it easy to balance the system to quietness.

In Fig. 4 I have shown a scheme in which an electron tube 31, having two plate elements 32 and 33 and a single filament element 34 heated by means of a suitable "A" battery 35, has a grid element 36 located in proximity to the plate element 32 and between the filament element 34 and the plate 32. The two plates 32 and 33 are located in different arms of the Wheatstone bridge. In the other two arms of the Wheatstone bridge are located variable impedances 37 and 38, and across one diagonal of the bridge is connected, as before, a source of alternating current 39. Across the other diagonal are connected telephone receivers 41.

The system is normally balanced in such manner that, when no signals are received, the impedances to the normal plate current flowing in the arms of the Wheatstone bridge comprising the plates 32 and 33 are balanced by the impedances 37 and 38, and there is no difference in potential between the points across which the telephone receivers 41 are connected. Upon receipt of a signal, however, the change in potential on the grid 36 affects the impedance of the path between the plate 32 and the filament 34, to change the resistance of the arm of the Wheatstone bridge containing the plate 32.

The impedance of the path between the filament 34 and the plate 33 is not affected to the same degree, however, by the grid 36. Accordingly, the Wheatstone bridge is thrown out of balance, and the alternating current input across one diagonal of the bridge may be detected in the telephone receivers 41 connected across the other diagonal of the bridge.

It is to be understood that, in the modification just described, I may employ a battery in series with the source of alternating current. A similar modification is shown in Fig. 5, wherein a plate battery 42 is connected in series with the plate 32. The operation of the scheme is similar to the operation previously described in connection with the modification shown in Fig. 4, with the difference that the direct current generated by the plate battery 42 allows both half waves of the alternating current source 39 to affect the bulb, since the plate current is pulsating but is not reversed.

In Fig. 6, I have shown a modification of the arrangement shown in Fig. 4, employing interrupted direct current in place of the alternating current input across the diagonal of the bridge. Connected across one diagonal of the bridge is a source of direct current 43 and the circuit to the bridge is broken by a circuit interrupting mechanism which may be similar in all respects to that described in connection with Fig. 3. As before noted, the peculiar advantage of interrupted direct current over alternating current is that the bridge is less difficult to balance to eliminate the alternating current hum, for the reason that the interrupter does not have as high a capacity to ground as a generator.

I have devised systems for the amplification of received currents in which an electron tube is employed in a balanced Wheatstone bridge arrangement. The plate circuit resistance is varied by the incoming signals to unbalance the bridge, and means are provided for causing the unbalancing of the bridge to be detected. By my invention, I have made the use of heterodyning unnecessary, for by employing alternating or pulsating current connected across one diagonal of the bridge I may detect undamped received waves.

Since I have not shown all the possible modifications of my system which may be conceived by those skilled in the art, I desire that my invention shall be limited only by the scope of the appended claims and the showing of the prior art.

I claim as my invention:

1. A signal-current amplifying device comprising an electron tube having two plates and a cathode, means for selectively modulating the internal impedance of one of the plate circuits to a greater extent than the other, means for impressing said modulating means with currents varying in accordance with a received signal, balanced impedance devices serially connected across said plates, a circuit including a source of electrical energy connected between said cathode and the common junction of said impedance devices, a signal translating device, and means for operatively associating said translating device with a portion or all of said impedance devices whereby disturbances in the balancing are detected.

2. In a signal-receiving system, a vacuum tube including a cathode and two anodes, whereby two space-current paths are provided, a Wheatstone bridge comprising said two space-current paths as two arms, two impedances as the two remaining arms, a source of periodic current between said cathode and said two impedances as one diagonal, and a translating device as the other diagonal thereof, a grid in said vacuum tube influencing the impedance of one of said space-current paths more than the other, means for maintaining an average potential upon said grid and means in the arm of said bridge including the space-current path most influenced by said grid tending to counteract the effect of said average potential and means for impressing a signal-controlled potential upon said grid.

3. In a signal-receiving system, a vacuum tube including a cathode and two anodes, whereby two space-current paths are provided, a Wheatstone bridge comprising said two space-current paths as two arms, two impedances as the two remaining arms, a source of periodic current between said cathode and said two impedances as one diagonal, and a translating device as the other diagonal thereof, a grid in said vacuum tube influencing the impedance of one of said space-current paths more than the other, means for impressing on said grid a potential corresponding to the signal, a grid leak and grid condenser in circuit with said means and said grid, and a source of direct-current potential in that arm of said bridge most influenced by said grid.

In testimony whereof, I have hereunto subscribed my name this 23rd day of March, 1921.

QUINCY A. BRACKETT.